Jan. 30, 1973  L. KATZMAN ET AL  3,714,392
NON-SPITTING VAPORIZING UNIT
Filed Dec. 13, 1971  2 Sheets-Sheet 1
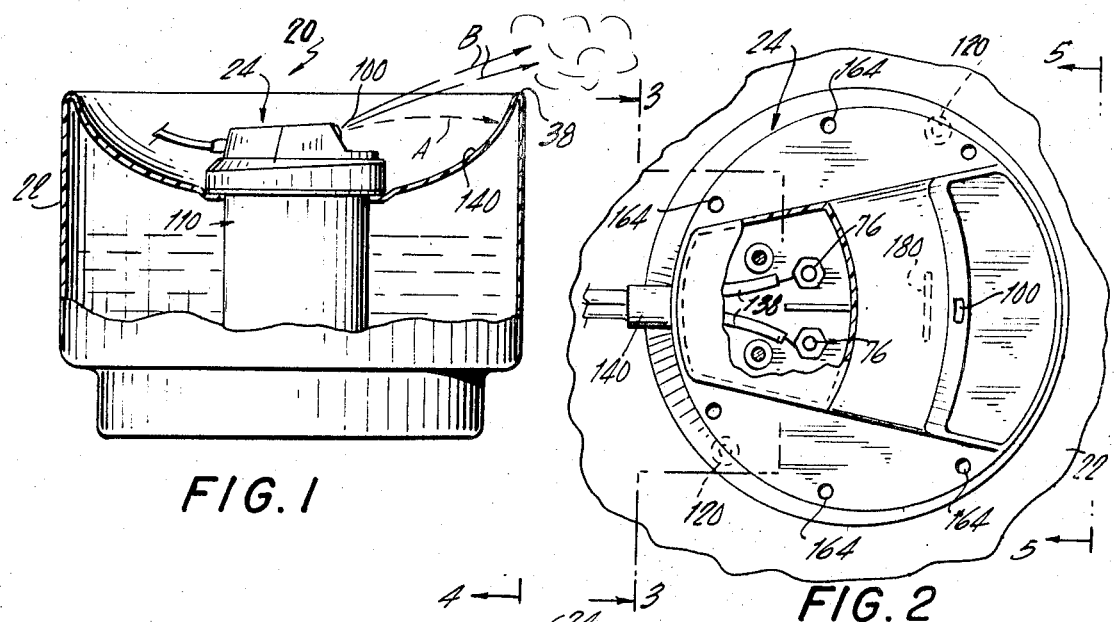
FIG. 1
FIG. 2
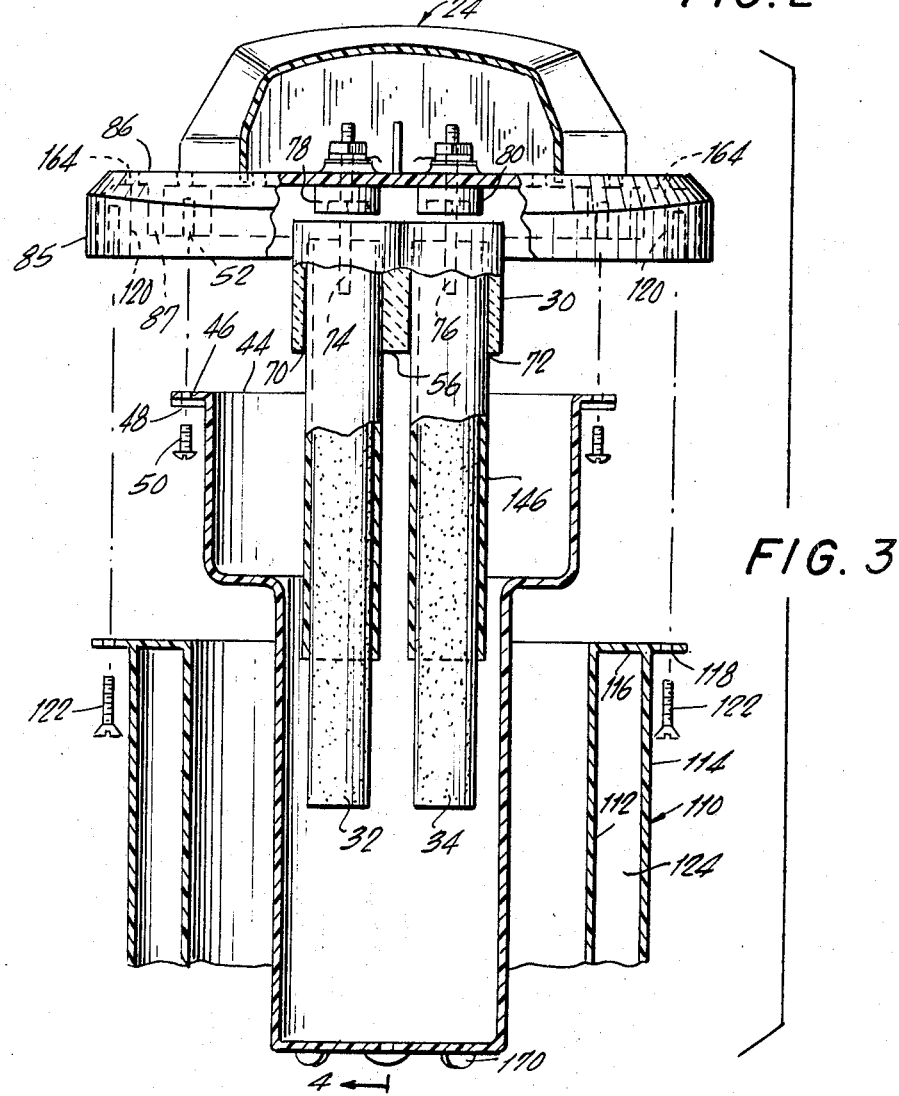
FIG. 3

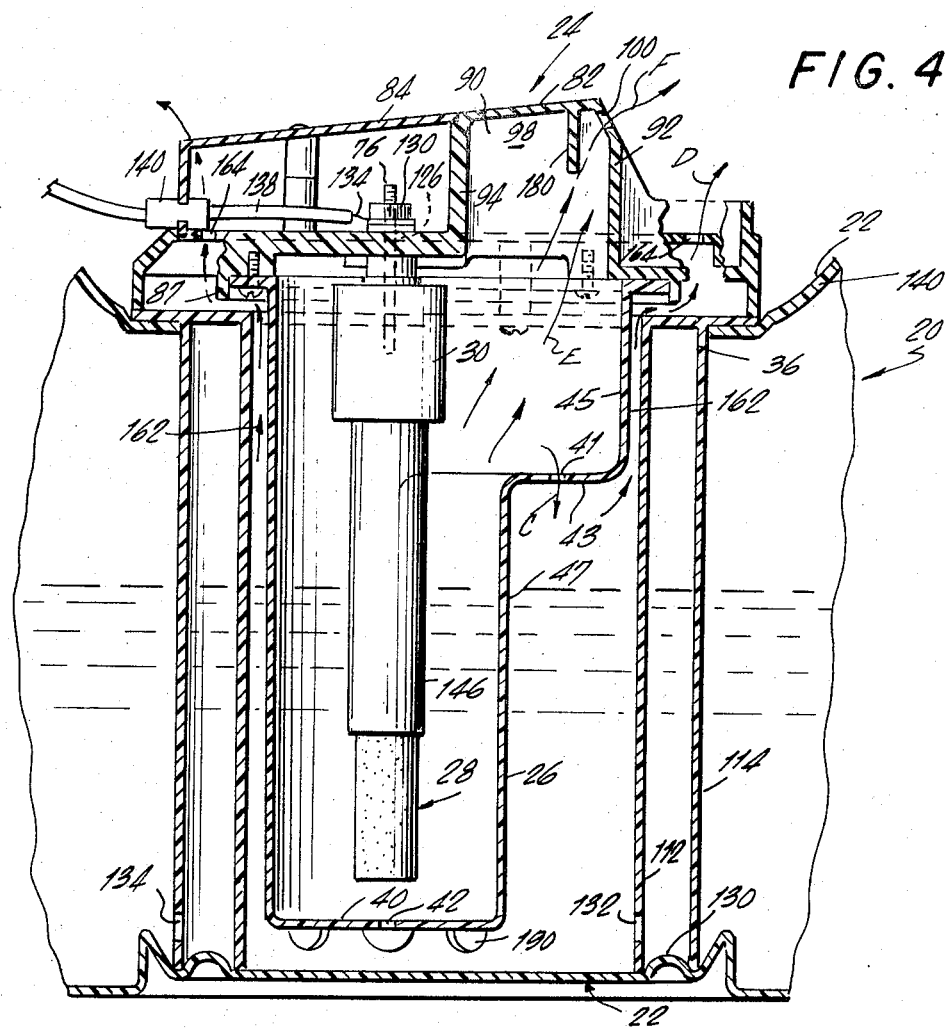

United States Patent Office 3,714,392
Patented Jan. 30, 1973

3,714,392
NON-SPITTING VAPORIZING UNIT
Lawrence Katzman, New York, and Edward Briggin, Brooklyn, N.Y., assignors to Kaz Manufacturing Co., Inc., New York, N.Y.
Filed Dec. 13, 1971, Ser. No. 207,244
Int. Cl. H05b 3/60; A61m 15/00
U.S. Cl. 219—284   9 Claims

ABSTRACT OF THE DISCLOSURE

The heating chamber of a vaporizer is suspended from a cap seated in a concavity in the upper surface of a water container and has contained therein a pair of electrodes having at least a part of their upper portions covered with sleeves of insulating material. An insulating assembly carried by the cap surrounds the heating chamber in spaced relation thereto to form a vent space. The chamber has a water inlet opening and the cap has a steam outlet in the order of 3.8 times the size of the inlet opening. A normal steam outlet path communicates the outlet with the heating chamber. The heating chamber includes steam vent means communicating with the vent space. The cap has at least one aperture isolated from the normal steam outlet path and spaced from the steam outlet and communicating with said vent space so that excess steam produced under abnormal operating conditions can pass through the vent means to the vent space and thence out of the apertures.

---

This invention relates to electric steam vaporizers and particularly to improvements in the steam producing means and insulating means provided therefor.

In the past, electrical steam vaporizers have been produced which were employed with a pair of spaced electrodes mounted in a heating chamber for heating water and converting the water to steam. In the copending application, Ser. No. 184,441, filed Sept. 28, 1971, for "Heat Insulating for Vaporizers," there is disclosed an arrangement which employs an insulating chamber which surrounds the heating chamber. The heating chamber is for the purpose of substantially instantaneously heating the water to change the water into steam and is arranged so that the water in the main container can flow into the heating chamber as steam is being produced. It is sometimes desired to use an electrolyte, such as salt, and if, instead of following instructions, many times the required amount of salt is introduced into the vaporizer, the amperage will be greatly increased causing more heat to be produced by the electrodes, thereby creating great billows of steam. This overproduction of steam had in the past raised the possibility of creating a "spitting" due to the fact that there was not adequate venting to take care of the overly produced quantities of steam.

The concept of this invention is to provide for all eventualities so as to prevent spitting by adequately venting the apparatus. If, by some chance, great voltages and amperages are applied across the electrode, the present invention prevents any deleterious results by providing a baffle and by creating a new shaped container for control of spitting. Further, the concept of this invention provides for sheathing the electrodes so that steam is created at the bottom of the heating chamber. In summary, the vaporizer employs a container with a cap positioned thereon. The cap is provided with steam outlet means for dispensing steam under ordinary normal operating conditions. A heating chamber depends from the cap to form a normal steam outlet path from the heating chamber to the cap and through the steam outlet means. An insulating chamber depends from the cap and surrounds the heating chamber forming a vent space. Additional means is provided in the heating chamber. The cap has at least one aperture therethrough isolated from the normal steam outlet path and spaced from said steam outlet means and communicating with said vent space so that excess steam produced under abnormal operating conditions can pass through the vent means to the vent space and thence out of the aperture.

It is therefore an object of the present invention to provide an arrangement including an insulating assembly which will adequately vent the heating chamber should there be an overproduction of steam.

A further object of the present invention is to provide for baffle means integral with the cap which will deter spitting.

An additional object of the invention is to provide for a construction wherein the comparative size of the openings of the water inlet opening and the steam outlet opening is so arranged that water will not be pushed back by steam into the bowl.

Yet another object of the invention is to provide for an arrangement employing sheathed electrodes.

Still further objects and features of this invention reside in the provision of a vaporizer of novel construction which may be made out of any readily available materials, yet which has markedly increased factors of safety in operation.

These, together with the various ancillary objects and features of this invention, which will become apparent as the following description proceeds, are attained by this non-spitting vaporizing unit, preferred embodiments of which are illustrated in the accompanying drawings, by way of example only, wherein:

FIG. 1 is an elevational view of a vaporizer constructed in accordance with the concepts of the present invention, with parts thereof being broken away to show the construction of other parts in detail;

FIG. 2 is a top plan view of a portion of the cap and heating chamber, with parts thereof being broken away;

FIG. 3 is an exploded vertical sectional view taken along the planes of lines 3—3 in FIG. 2;

FIG. 4 is a vertical sectional view taken along the plane of line 4—4 in FIG. 3; and, FIG. 5 is an elevational view with parts shown in section looking along the plane of line 5—5 in FIG. 3.

With continuing reference to the accompanying drawings, wherein like reference numerals designate similar parts throughout the various views, reference numeral 20 generally designates the electric steam vaporizer comprising the present invention. This vaporizer is constructed out of four major parts which include a container 22 of desired shape and which is preferably blow-molded from linear polyethylene.

In addition to the container 22 there is provided a cap assembly 24 formed of a suitable phenolic resin material such as a heat resistant Bakelite, and instantaneous heating chamber, generally indicated at 26 and formed of nylon or "noryl." There is also provided an electrode assembly 28 including an insulating mounting member 30 and a pair of carbon electrodes 32 and 34. The container 22 is formed with a concave upper face forming a peripheral rim 38 at the upper outer edge thereof.

The instantaneous heating chamber 26 has a bottom wall 40 provided with an opening 42 therein. The chamber 26 has an enlarged upper portion 45 and a restricted lower portion 47 offset from one side of the enlarged portion 45. The restricted lower portion 47 has one wall portion lying flush with the enlarged portion 45. A closure wall 43 having at least one vent aperture 41 therein joins the two portions together. At the open end 44 of the upper portion 45 there is a peripheral flange 46 having a plurality of apertures 48 therethrough. Screw type fasteners 50 are adapted to extend through the apertures 48 for securement in suitable threaded recesses 52 in the cap assembly 24 so that the instantaneous heating chamber 26 is held in fixed relationship to the cap, whereby upon removal of the cap, the heating chamber 26 is also removed therefrom.

The electrode assembly 28 is so arranged that the insulating body 30 which is formed of porcelain is of a general rectangular cross section provided with recesses 70 and 72 opening into the bottom 56 of the mounting member 30 and embedded in the upper portions of the electrodes 32 and 34 are metallic studs 74 and 76 formed of brass or other corrosion resistant conductive metal which are externally threaded. The studs 74 and 76 extend through and above the mounting member 30 and have flanges 78 and 80 formed thereon which engages the top suspending the electrodes 32 and 34 in place. The threaded studs are adapted to be further secured to the cap assembly 24. The electrodes 32 and 34 are formed of carbon and the largest portion of their length by far is unsupported, only the ends extending into recesses 70 and 72.

The cap assembly is formed in two parts including a main body 82 and a cover 84.

The main body 82 has a peripheral side wall 85 which is circular in cross section and adapted to overlie the opening 36 in the container 22. Integrally formed with the peripheral wall 85 is an upper wall 86 which is provided with a downwardly extending peripheral flange 87 adapted to surround the peripheral flange 46 of the instantaneous heating chamber 26 when the chamber 26 is secured in place by means of the screws 50 being threadedly engaged in threaded recesses 52. The flange 87 serves to center and seat the instantaneous heating chamber 26.

Integrally formed with the upper wall 86 is a steam chamber 90 bounded by a front wall 92 and a rear wall portion 94 as well as spaced side walls 98. The front wall 92 is provided with a stem outlet opening 100 therein.

An insulating assembly 110 is provided, which includes an inner cylindrical wall 112 and an outer cylindrical wall 114 joined by a top wall 116, which extends beyond the outer wall 114 to form a peripheral flange 118. The heating assembly 110 defines an insulating chamber 124 and is secured to the cap 24 by means of screw-type fasteners 122 extending through the flange 118, and which threadedly engage bosses 120 integrally depending from the cap 24 so that the insulating assembly 110 depends from the cap 24, and when the cap is raised, the insulating assembly 110 will be raised therewith.

As shown in FIG. 4, the bottom of the container 22 is provided with a rib 130 which is engaged by one or both of the cylindrical walls 112 and 114 which have openings 132 and 134 respectively therein for permitting fluid flow to the opening 42 from the outer reaches of the container 22. The bottom of the container 22 may be otherwise configured in order to provide a solid footing and resistance against tilting in any direction, even when placed on an inclined surface. The upper surface 140 of the container 22 is of a concave configuration and the rim 38 extends above the steam outlet opening 100. Hence, any spitting in the direction of arrow A will, because of the weight of the water vapor, abut against the contours of the surface 140, as can be seen in FIG. 1, while steam will be directed in the direction of arrows B.

In order to prevent spitting, sleeves 146 of polyvinyl chloride, Mylar, or similar insulative synthetic plastic material are provided at the top portions of electrodes 32 and 34 so that the steam will be generated in the lower reaches of the heating chamber 26. Thus, steam will be bubbled upward through the water and this bubbling action, it has been found, tends to decrease spitting. Further, overproduction of steam will not force the water back through the opening 42 provided the opening 100 is approximately 3.8 times the size of the opening 42. This is true for the particular vented construction of applicants' invention wherein the vent opening 41 is provided in the heating chamber and permits overproduced steam to escape in the direction of arrows C and pass through the vent space 162 provided between the heating assembly 110 and the heating chamber 26 and thence through a plurality of openings 164 in the direction of arrows D. The openings 164 are provided in spaced relationship along the cap and may be of any convenient shape and size, as desired.

With the entire device assembled, it will be noted that the electrode assembly 28 is disposed with the mounting member 30 within the enlarged portion 45 of the heating chamber, while the unsheathed portion of the electrodes are in the lower portion of the restricted portion 47 of the heating chamber 26. The heating chamber is prevented from touching the bottom of the container 22 by spacers 190. The insulating chamber 110 is held in spaced relationship with the heating chamber 26, and if for any reason the total power used by the electrodes is greatly increased as when the conductor cord 138 is connected to a source of power at a considerably higher voltage than 110 volts, or when excessive amounts of electrolyte are placed into vaporizers in contradiction to proper instructions, steam, which would otherwise be generated in predetermined amounts and which would pass in the direction of arrows E and F through opening 100, will now also be able to pass through the vent openings 41 and thence through the vent space 162 and through the vent openings 164. Spitting is rendered less likely by the presence of a baffle 180 which is integrally molded with the top 82 and extends downwardly immediately adjacent the opening 100. Further, if there were to occur spitting for any reason, the deleterious action of the spitting would be obviated by the contoured configuration of the bowl itself.

A latitude of modification, substitution and change is intended in the foregoing disclosure, and in some instances some features of the invention may be employed without a corresponding use of other features.

We claim:

1. A vaporizer comprising a container, a cap positioned on said container, said cap being provided with steam outlet means for dispensing steam under normal operating conditions, a heating chamber depending from said cap into said container and communicating therewith to form a normal steam outlet path from said heating chamber to said cap and through said outlet means, an insulating assembly depending from said cap and surrounding said heating chamber in spaced relation thereto and forming a vent space therebetween, said heating chamber having an inlet opening therein for receiving liquid from said vaporizer bowl, said heating chamber having vent means therein communicating with said vent space, an electrode assembly suspended from said cap and extending into said heating chamber, means for connecting said electrode assembly to a source of electrical power, said cap having at least one aperture therethrough isolated from said normal steam outlet path and spaced from said steam outlet means and communicating with said vent space so that excess steam produced under abnormal operating conditions can pass through said vent means to said vent space and thence out of said aperture.

2. A vaporizer according to claim 1, wherein said outlet means is an outlet opening in the order of 3.8 times the size of the said inlet opening so that water will not be pushed by steam out of said inlet opening.

3. A vaporizer according to claim 1, wherein at least a part of the upper portion of said electrodes is covered with sleeves of insulating material so that steam is formed at the lower portion of said heating chamber.

4. A vaporizer according to claim 1, including baffle means depending from said cap adjacent said outlet means for preventing spitting.

5. A vaporizer according to claim 4, wherein said baffle is integral with said cap, and fastener means detachably securing said heating chamber and said insulating assembly to said cap.

6. A vaporizer according to claim 1, wherein said container has a concave upper surface having a peripheral rim extending above said outlet means.

7. A vaporizer according to claim 1, wherein said insulating assembly includes a pair of spaced walls defining an insulating chamber.

8. A vaporizer according to claim 7, wherein said container has its bottom provided with at least one circular rib, at least one of said spaced walls engaging said rib.

9. A vaporizer according to claim 8, said container having a concave upper surface having a peripheral rim extending above said outlet means, said outlet means being an outlet opening approximately 3.8 times the size of said inlet opening so that water will not be pushed by steam out of said inlet opening, baffle means integral with and depending from said cap adjacent said outlet opening for preventing spitting, at least a part of the upper portion of said electrodes being covered with sleeves of insulating material, and fastener means detachably securing said heating chamber and said insulating assembly to said cap.

References Cited

UNITED STATES PATENTS

| | | | |
|---|---|---|---|
| 2,763,765 | 9/1956 | Duberstein | 219—289 X |
| 2,542,529 | 2/1951 | Hunt | 219—276 X |
| 2,818,486 | 12/1957 | Schmitt et al. | 219—288 X |
| 2,140,516 | 12/1938 | Cowan | 219—275 X |
| 3,610,879 | 10/1971 | Katzman et al. | 219—284 X |
| 3,637,978 | 1/1972 | Corbett et al. | 219—284 |
| 3,319,046 | 5/1967 | Katzman et al. | 219—275 |
| 2,843,891 | 7/1958 | Fisher | 219—275 UX |
| 2,076,709 | 4/1937 | Deutsch | 219—271 X |
| 3,308,267 | 3/1967 | Fenstermaker | 219—293 X |
| 3,659,078 | 4/1972 | Rudstrom | 219—288 X |

ANTHONY BARTIS, Primary Examiner

U.S. Cl. X.R.

21—119; 128—192; 219—271, 275, 288